United States Patent
Butts et al.

(10) Patent No.: US 6,233,541 B1
(45) Date of Patent: *May 15, 2001

(54) SERVER AND WEB BROWSER TERMINAL EMULATOR FOR PERSISTENT CONNECTION TO A LEGACY HOST SYSTEM AND METHOD OF OPERATION

(75) Inventors: Thomas H. Butts, Wills Point; Stuart H. Burris, Jr., Garland; Stephen J. Clark, Irving; Eric P. Armstrong; Daniel B. Kuhn, both of Lewisville; Stanley M. Ratliff, Denton; Mohammad K. Sharif; Gene E. Toye, both of Carrollton, all of TX (US)

(73) Assignee: OpenConnect Systems Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/069,522

(22) Filed: Apr. 29, 1998

Related U.S. Application Data

(63) Continuation of application No. 08/625,109, filed on Apr. 1, 1996, now Pat. No. 5,754,830.

(51) Int. Cl.$^7$ .................................................. C21B 13/10
(52) U.S. Cl. ........................... 703/27; 709/311; 710/105; 370/466; 370/469
(58) Field of Search ................................. 703/27, 26, 23; 709/246, 218, 206, 203, 227, 228, 313; 705/9; 707/1; 370/466, 469; 710/105

(56) References Cited

U.S. PATENT DOCUMENTS

| | | | |
|---|---|---|---|
| 5,228,137 | 7/1993 | Kleinerman | 703/26 |
| 5,475,836 | 12/1995 | Harris et al. | 709/206 |
| 5,485,369 | 1/1996 | Nicholls et al. | 705/9 |
| 5,497,463 | 3/1996 | Stein et al. | 709/203 |
| 5,530,852 | 6/1996 | Meske, Jr. et al. | 709/206 |
| 5,568,612 | 10/1996 | Barrett et al. | 709/203 |
| 5,600,833 | 2/1997 | Senn et al. | 707/1 |
| 5,617,540 | 4/1997 | Civanlar et al. | 709/227 |
| 5,619,650 | 4/1997 | Bach et al. | 709/246 |
| 5,634,006 | 5/1997 | Baugher et al. | 709/228 |
| 5,634,127 | 5/1997 | Cloud et al. | 709/313 |
| 5,636,371 | 6/1997 | Yu | 703/26 |
| 5,754,830 | * 5/1998 | Butts et al. | 709/311 |

OTHER PUBLICATIONS

"Mobile Telescript Agents and the Web", by P. Domel, COMPCON '96 IEEE Computer Society International, 1996, pp. 52–57.

(List continued on next page.)

Primary Examiner—Eric W. Stamber
Assistant Examiner—Russell W. Frejd
(74) Attorney, Agent, or Firm—Baker Botts L.L.P.

(57) ABSTRACT

A computer network environment (10) allowing connection of a client system (36) to a legacy host system (18,19) using a server (26) is provided. The computer network environment (10) includes a legacy host system (18,19) having TCP/IP connectivity. The legacy host system (18,19) is operable to support a terminal session for access to the legacy host system (18,19). The computer network environment (10) also includes a server system (24) executing a client thread (28) under a server (26). The client thread (28) is operable to communicate with the legacy host system (18,19) across a persistent TCP/IP socket connection (30). The computer network environment (10) further includes a client system (36) executing an applet process (42) under a web browser (38). The applet process (42) is operable to communicate with the client thread (28) across another persistent TCP/IP socket connection (44) and is operable to provide a terminal session to a user of the client system (36). This terminal session is supported by a persistent connection allowing real-time bidirectional communication with the legacy host system (18,19).

55 Claims, 2 Drawing Sheets

OTHER PUBLICATIONS

"Java Security: From HotJava to Netscape and beyond", by Dean et al., Security and Privacy 1996 IEEE Symposium, Feb. 1996, pp. 190–200.

"Mobile Intelligent Agent Systems: Wave vs. Java", by Vuong et al., Emerging Technologies and Applications in Communication, 1996 IEEE Conference, Mar. 1996, pp. 196–199.

"Java and the Shift to Net–Centric Computing", by M. Hamilton, IEEE Computer Magazine, Aug. 1996, pp. 31–39.

"Java, the Web, and Software Development", by E. Yourdon, IEEE Computer Magazine, Aug. 1996, pp. 25–30.

"Interoperable Object Models for Large Scale Distributed Systems", by Newell et al., IEE Colloq. No. 184: Client/Server Computing Seminar Proceedings, 1995, pp. 14/1–14/6.

"Multiple Service Integration Confronted with Legacy Systems," by Lous Perrochon, Contribution to the Workshop *Offering the same information via multiple services of the First International Conference on the World–Wide Web*, Geneva, May 1994.

"Translation Servers: Gateways Between Stateless and Stateful Information Systems," by Louis Perrochon, located on the World–Wide Web, 1994.

"IDLE: Unified W3–Access to Interactive Information Servers," by Louis Perrochon, Roman Fischer, Computer Networks and ISDN Systems 27 (1995), pp. 927–938.

Amitabh Dave, Mohlalefi Sefika and Roy H. Campbell, "Proxies, Application Interfaces, and Distributed Systems," *Proc. 2nd Intl. Conf. on Object Orientation in Operating Systems*, Sep. 24–25, 1992, Dourdan, France.

Venkata N. Padmanabhan, Jeffrey C. Mogul, "Improving HTTP Latency," Computer Networks and ISDN Systems 28 (1995) pp. 25–35.

Jeffrey C. Mogul, "The Case for Persistent–Connection HTTP," *Proc. of ACM SIGCOMM '95 Conference on Applications, Technologies, Architectures, and Protocols for Computer Communication*, Aug. 28 to Sep. 1, 1995, Cambridge, Massachusetts.

Hot Java Applet Programming Contest–Winners, third prize "Terminal Emulator", <http://www.javasoft.com/contest/winners.html and <http://www.javasoft.com/contest/authors.html.

TN3270 Java Terminal Emulator and Libraries, <http://www.unige.ch/hotjava/HotSIBIL.html and <http://www.unige.ch/hotjava/TN3270.html.

* cited by examiner

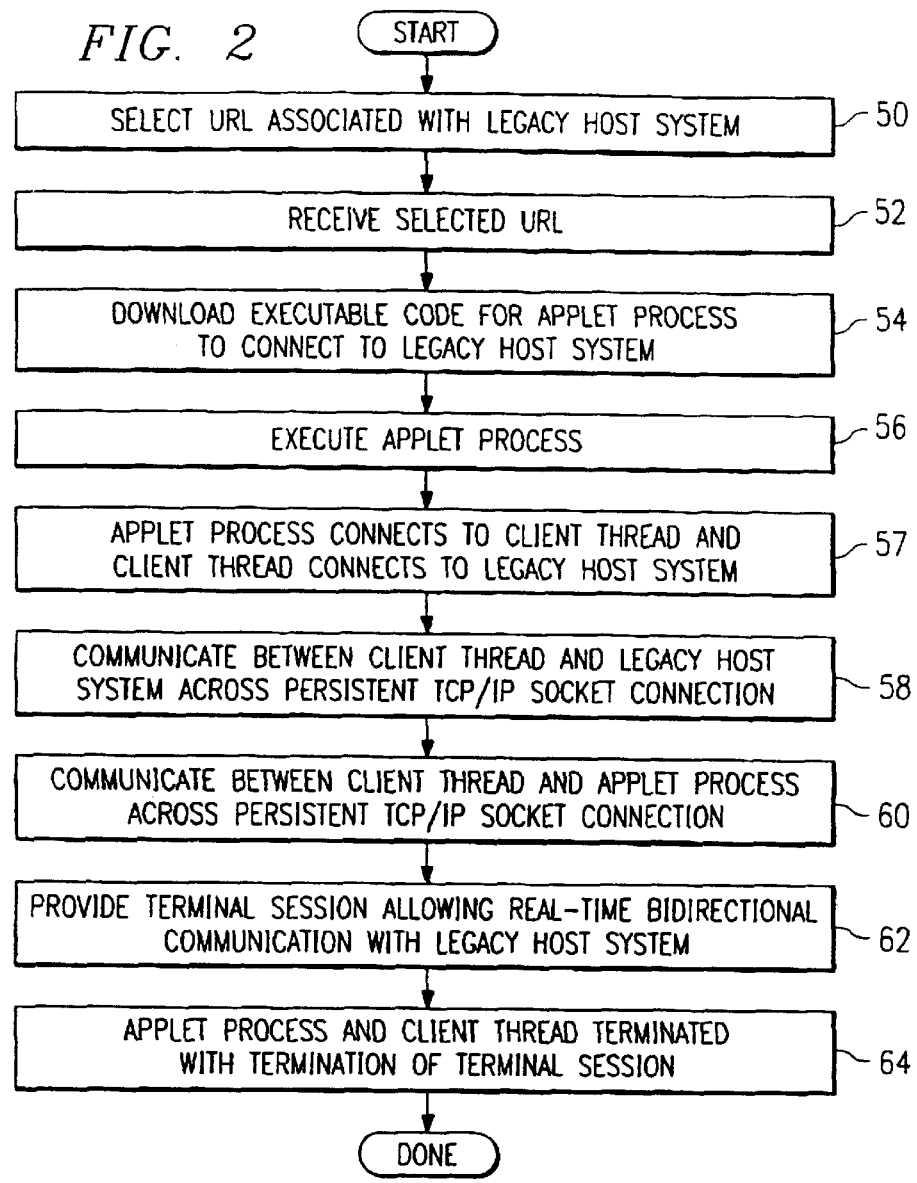
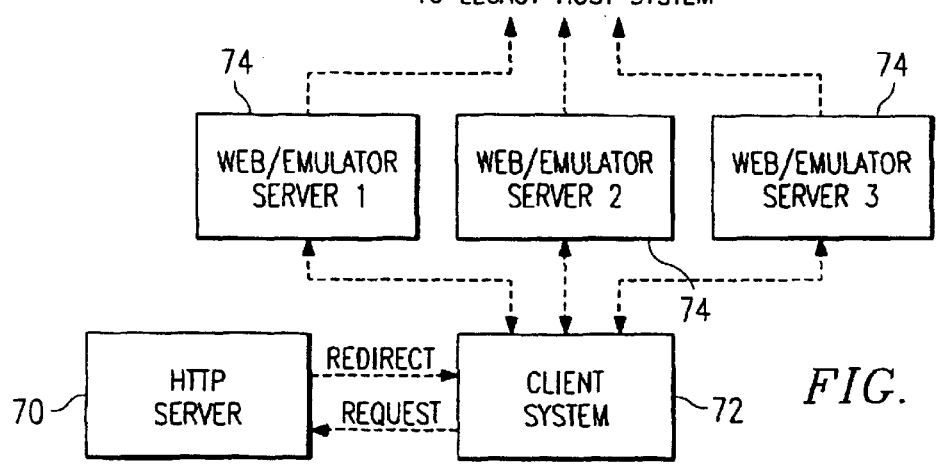

SERVER AND WEB BROWSER TERMINAL EMULATOR FOR PERSISTENT CONNECTION TO A LEGACY HOST SYSTEM AND METHOD OF OPERATION

CROSS-REFERENCE TO RELATED APPLICATIONS

This application is a continuation of Application Ser. No. 08/625,109 filed Apr. 1, 1996 by Thomas H. Butts, et al. and entitled "Server and Web Browser Terminal Emulator for Persistent Connection to a Legacy Host System and Method of Operation", now U.S. Pat. No. 5,754,830.

TECHNICAL FIELD OF THE INVENTION

This invention relates in general to the field of electronic systems, and more particularly to a server and a web browser terminal emulator for persistent connection to a legacy host system and a method of operation.

BACKGROUND OF THE INVENTION

Many organizations operate computer network environments that include legacy host systems which store data and provide applications important to the operation of the organization. Such legacy host systems can include IBM mainframes (MVS, VM and VSE environments), IBM AS/400 systems and UNIX host systems.

It is desirable for such organizations to provide connection to the legacy host systems through terminal sessions on distributed client systems such as personal computers and computer workstations. This connection to the legacy host system provides access for users of the client systems to the data and applications on the legacy host system. These terminal sessions can include 3270, 5250, NVT and VT220 type terminal sessions.

One conventional method for providing terminal sessions is to execute a terminal emulator application on the client systems that connects directly to a host legacy system using a TCP/IP socket connection. Another conventional method is to provide connection through a web browser application by translating standard legacy data flows into HTML pages. However, such conventional web browser methods suffer from an inability to handle real-time host updates to user screens as well as other significant problems. For example, forms-based HTML/TN3270 packages are unable to overcome a range of problems associated with common HTML implementations such as real-time host updates to user screens or finding a user's browser platform address on the network.

SUMMARY OF THE INVENTION

In accordance with the present invention, a server and a web browser terminal emulator for persistent connection to a legacy host system and a method of operation are provided that substantially eliminate or reduce disadvantages and problems associated with previously developed methods.

According to one aspect of the present invention, a computer network environment allowing connection of a client system to a legacy host system using a server is provided. The computer network environment includes a legacy host system having TCP/IP connectivity. The legacy host system is operable to support a terminal session for access to the legacy host system. The computer network environment also includes a server system executing a client thread under a server. The client thread is operable to communicate with the legacy host system across a persistent TCP/IP socket connection. The computer network environment further includes a client system executing an applet process under a web browser. The applet process is operable to communicate with the client thread across another persistent TCP/IP socket connection and is operable to provide a terminal session to a user of the client system. This terminal session is supported by a persistent connection allowing real-time bidirectional communication with the legacy host system.

According to another aspect of the present invention, a server for providing a persistent connection between a client system and a legacy host system is provided. The server includes a client thread operable to communicate with a legacy host system across a persistent TCP/IP socket connection. The server also includes applet code operable to create an applet process executing under a web browser on a client system. When executed, the applet process is operable to communicate with the client thread across another persistent TCP/IP socket connection and to provide a terminal session to a user of the client system. The server is operable to download the applet code to a client system in response to receiving a uniform resource locator associated with the legacy host system.

According to a further aspect of the present invention, a method is provided for connecting a client system to a legacy host system using a server. A uniform resource locator associated with a legacy host system is selected from a web browser executing on a client system. The uniform resource locator is received by a server executing on a server system. Executable code for an applet process is then downloaded to the client system, and the applet process is executed under the web browser on the client system. The applet process is connected to a client thread executing under the server via a persistent TCP/IP socket connection. The client thread is connected to a legacy host system associated with the uniform resource locator via another persistent TCP/IP socket connection. The client thread and the legacy host system communicate across the first persistent TCP/IP socket connection, and the client thread and the applet process communicate across the second persistent TCP/IP socket connection. A terminal session is provided by the applet process to a user of the client system which allows real-time bidirectional communication with the legacy host system across a persistent connection to the legacy host system.

A technical advantage of the present invention is the ability to allow users to access legacy host system data, such as IBM mainframe data, from client systems, such as desk top personal computers and computer workstations, using a web browser where the access is provided through a persistent TCP/IP socket connection to the legacy host system. This ensures a persistent bidirectional connection to the legacy host system such that real-time host updates, security, encryption, help-desk support, and other real-time features can be supported. One embodiment of the present invention uses SUN MICROSYSTEMS' JAVA technology and includes JAVA-capable web browsers and embedded JAVA applet processes to provide terminal session connectivity to the distributed client systems.

Another technical advantage of the present invention is the provision of connectivity to a legacy host system through web browsers without the need for specialized emulation software to be manually loaded on each client computer system and without the need for user programming.

A further technical advantage of the present invention is allowing the expansion of access to existing data and applications on legacy host systems from existing client systems using existing network capabilities. The present invention provides a network environment that allows the use of a web browser environment, having web browser tools, such as JAVA tools, and web-serving, to incorporate Internet-type technologies, through the Internet or an intranet, with existing network architectures.

BRIEF DESCRIPTION OF THE DRAWINGS

FIG. 2 is a flow chart of a method for connecting a client system to a legacy host system using a server according to the teachings of the present invention; and FIG. 3 is a block diagram of load-balancing across multiple servers according to the teachings of the present invention.

DETAILED DESCRIPTION OF THE INVENTION

Figure 1:
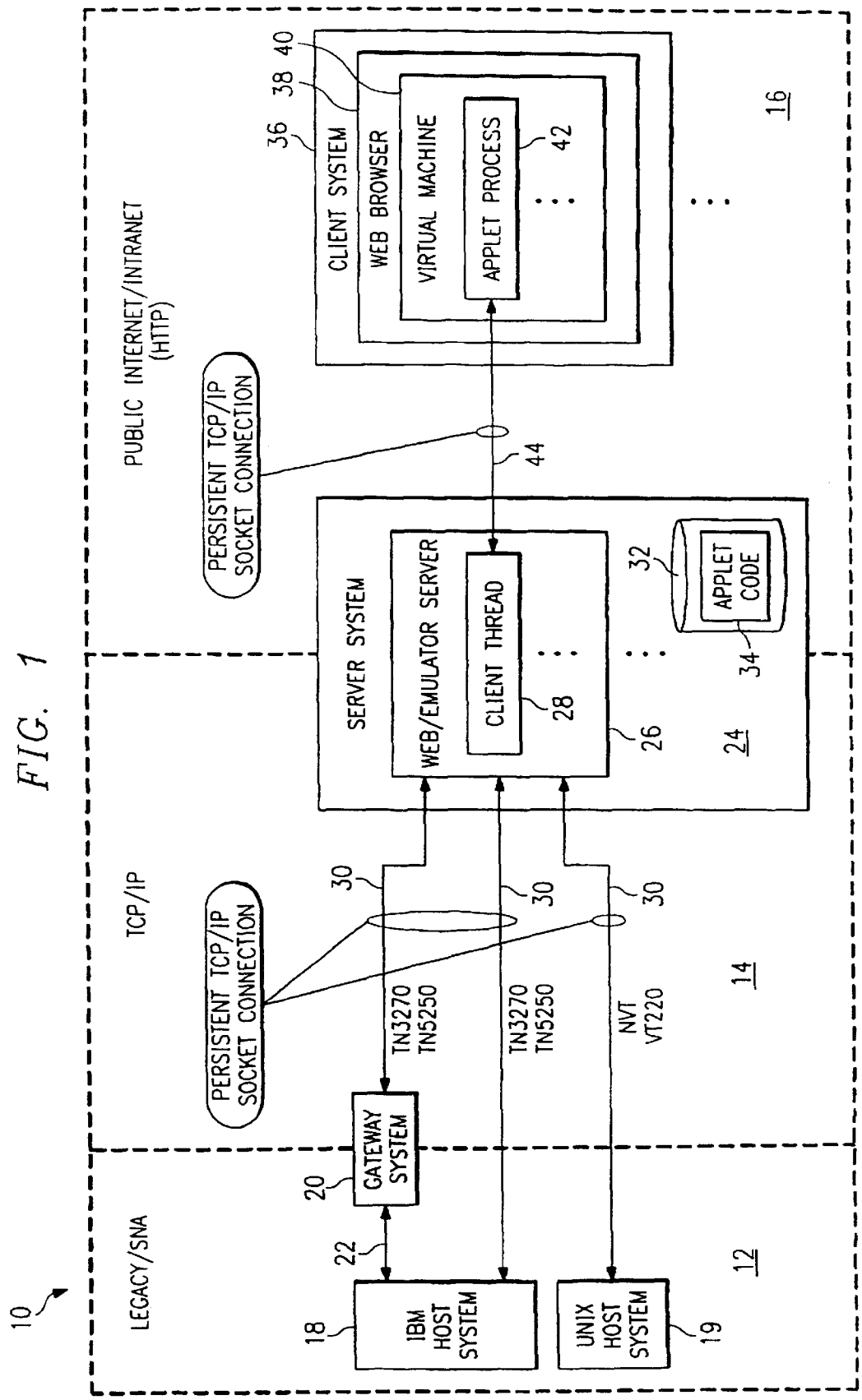
FIG. 1 is a block diagram of a computer network environment that allows connection of a client system to a legacy host system using a web/eumulator server according to the teachings of the present invention.

FIG. 1 is a block diagram of a computer network environment, indicated generally at 10. Network environment 10 includes a legacy/SNA environment 12, a TCP/IP environment 14 and a public Internet/intranet environment 16.

Legacy/SNA environment 12 includes one or more legacy host systems such as an IBM host system 18 and a UNIX host system 19. IBM host system 18 can comprise an IBM mainframe (MVS, VM and VSE environment) or an IBM AS/400 system. UNIX host system 19 can comprise a computer workstation or server running a UNIX-type environment.

A gateway system 20 can be coupled to IBM host system 18 via a connection 22. Connection 22 can comprise an SNA or channel attachment to IBM host system 18. Gateway system 20 provides an interface between legacy/SNA environment 12 and TCP/IP environment 14. Gateway system 20 can be integral with IBM host system 18 or can be a separate, add-on system extending the functionality of IBM host system 18. For example, gateway system 20 can comprise an OC SERVER II™ gateway product available from OPENCONNECT SYSTEMS. UNIX host systems 19 and some IBM host systems 18 have built in TCP/IP connectivity such that the use of a gateway system 20 is unnecessary.

TCP/IP environment 14 includes a server system 24. Server system 24 executes one or more web/emulator servers 26. Web/emulation server 26 provides an interface between TCP/IP environment 14 and public Internet/intranet environment 16 and is operable to execute one or more client threads 28. Web/emulator server 26 is operable to connect to gateway system 20, to IBM host system 18 and to UNIX host system 19 via a persistent TCP/IP socket connection 30. Server system 24 includes a data storage device 32 that stores applet code 34. Applet code 34 comprises executable code for an applet process. Web/emulation server 26 can comprise an OC://WEBCONNECT™ server available from OPENCONNECT SYSTEMS, and applet code 34 can comprise a JAVA applet for use within SUN MICROSYSTEM's JAVA environment.

Public Internet/intranet environment 16 includes one or more client systems 36. Client system 36 can comprise a desk top computer such as a personal computer or computer workstation. Client system 36 is operable to execute a web browser 38. Web browser 38 is operable to establish a virtual machine 40 for executing an applet process 42. Applet process 42 comprises an instance of applet code 34 downloaded to client system 36 by web/emulator server 26. Applet process 42 is connected to client thread 28 via a persistent TCP/IP socket connection 44. Web browser 38 can comprise a commercially available web browser application such as NETSCAPE NAVIGATOR that is JAVA-capable and applet process 42 can comprise a JAVA applet.

In operation, web/emulator server 26, client thread 28 and applet process 42 form a web browser terminal emulator providing a persistent bidirectional connection between client system 36 and a legacy host system such as IBM host system 18 or UNIX host system 19. Applet process 42 communicates with client thread 28 across persistent TCP/IP socket connection 44. Client thread 28 communicates with an appropriate legacy host system, either IBM host system 18 or UNIX host system 19, across a persistent TCP/IP socket connection 30. Client thread 28 and applet process 42 allow a user of client system 36 to use web browser 38 to invoke a terminal session for accessing data and applications on a legacy host system. Each web/emulation server 26 is operable to manage a plurality of client threads 28 associated with a plurality of applet processes 42. In one embodiment of the present invention, each web/emulation server 26 is operable to manage a thousand such connections.

Client thread 28 executes under web/emulator server 26 and is operable to communicate with a legacy host system across a persistent TCP/IP socket connection 30. Client thread 28 is operable to interface between TCP/IP environment 14 and public Internet/intranet environment 16. Applet process 42 executes under web browser 38 and is operable to communicate with client thread 28 across persistent TCP/IP socket connection 44. In one embodiment of the present invention, client thread 28 and applet process 42 using a web/emulator data flow. Applet process 42 is further operable to provide a terminal session to a user of the client system 36. The terminal session can comprise a 3270, 5250, NVT or VT220 type terminal session. This terminal session provided by applet process 42 and client thread 28 is supported by a persistent TCP/IP socket connection which allows real-time bidirectional communication with the legacy host system.

In one embodiment of the present invention, the applet process uses three threads to implement the terminal session. The applet process uses a READ thread, a WRITE thread and an EMULATION thread. The READ thread provides a buffer interface to persistent TCP/IP socket connection 44 and reads information from the socket. The WRITE thread provides a buffer interface to persistent TCP/IP socket connection 44 and writes to the socket. The EMULATION thread provides the user interface representing the terminal session on the legacy host system. In this embodiment, the applet process and the client thread communicate using a web/emulator data flow based upon the communication protocol that is set forth in APPENDIX A.

According to the present invention, a user of client system 36 can access data and applications on the legacy host system using web browser 38 where the access is provided through a persistent bidirectional connection to the legacy host system. Persistent TCP/IP socket connections 30 and 44 provide this persistent bidirectional connection to IBM host system 18 or UNIX host system 19 such that real-time host updates, security, encryption, help-desk support, and other real-time features are supported. One embodiment of the present invention uses SUN MICROSYSTEMS' JAVA technology and includes JAVA-capable web browsers 38 and embedded JAVA applet processes 42 to provide terminal session connectivity to client systems 36.

The present invention provides connectivity to legacy host systems such as IBM host system 18 and UNIX host system 19 through web browser 38 without the need for specialized emulation software to be manually loaded on each client system 36 and without the need for user programming. Web/emulator server 26 downloads applet code 34 to client system 36 when the uniform resource locator (URL) of the legacy host system is selected by the user. This is accomplished automatically without requiring service personnel to load software on client system 36.

The present invention also allows the expansion of access to existing data and applications on legacy host systems from existing client systems 36 using existing network capabilities. The present invention provides a network environment 10 that allows the use of a public Internet/intranet environment 16 having web browser tools, such as JAVA tools, and web-serving to incorporate Internet-type technologies, through the Internet or an intranet, with existing network architectures. Thus, an organization can implement web browser 38 based access to legacy host systems, such as IBM host systems 18 and UNIX host systems 19, without scrapping or significantly restructuring existing network resources.

FIG. 2 is a flow chart of a method for connecting a client system to a legacy host system using a web/emulator server according to the teachings of the present invention.

In step 50, a uniform resource locator (URL) associated with a legacy host system is selected from a web browser executing on a client system. The web browser can comprise a JAVA-capable NETSCAPE NAVIGATOR web browser as mentioned above. The selected uniform resource locator is received by a web/emulator server in step 52. In step 54, the web/emulator server downloads executable code for an applet process to the client system for connecting to the legacy host system. In step 56, the client system executes the applet process under the web browser. The applet process can comprise a JAVA applet for execution within a JAVA virtual machine within the NETSCAPE NAVIGATOR web browser.

In step 57, the applet process connects to a client thread executed by the web/emulator server, and the client thread connects to the legacy host system across persistent TCP/IP socket connections. In step 58, the client thread then communicates with the legacy host system across the persistent TCP/IP socket connection. This communication allows the client thread to establish and maintain a terminal connection to the legacy host system. In step 60, the client thread communicates with the applet process across a persistent TCP/IP socket connection. This communication can be accomplished using a web/emulator data flow such as that based upon the communication protocol set forth in APPENDIX A.

In step 62, the applet process provides a terminal session to a user of the client system. According to the present invention, this terminal session allows real-time bidirectional communication with the legacy host system across a persistent TCP/IP socket connection to the legacy host system. This terminal session, as mentioned above, can comprise a 3270, 5250, NVT or VT220 type terminal session.

The terminal session can be terminated by the user of the client system as desired. The applet process and client thread are terminated, in step 64, when the terminal session is terminated. In one embodiment, after termination, the applet process is removed from execution memory and is no longer present on the client system. In another embodiment, the executable code for the applet can be stored on a data storage device associated with the client system. In this embodiment, the web/emulation server can check the client system to determine whether new executable code for the applet needs to be downloaded based upon the version present, if any, on the data storage device of the client system.

The present invention provides an interface to legacy data flows, such as telnet (TN) data flows, across persistent TCP/IP socket connections to give users persistent bidirectional access to legacy host system data in terminal sessions, such as 3270, 5250, NVT and VT220 type terminal sessions. According to the present invention, terminal emulation is partially provided by applet executable code downloaded from the web/emulation server. The user can select the uniform resource locator (URL) of the legacy host system via a web browser package, such as NETSCAPE's NETSCAPE NAVIGATOR, and transparently receive the applet code which is executed and invokes an appropriate terminal session.

The present invention provides users of the client system access to real-time legacy host system data and applications using a web browser. The web/emulator server system converts standard legacy data flows into web/emulator data flows and vice versa permitting multi-session, multi-protocol access to legacy data and applications. The applet process converts the web/emulator data flows into a terminal session for display to the user. As mentioned above, the web browser can comprise a JAVA-capable web browser, the applet process can be a JAVA applet, and the web/emulator data flow can be based upon the protocol set forth in Appendix A. This embodiment of the present invention can blend web browsers enhanced by SUN MICROSYSTEMS' JAVA with legacy host systems having TCP/IP connectivity to allow users on any client system platform to connect to and access legacy host systems via 3270, 5250, NVT and VT220 type terminal emulation.

FIG. 3 is a block diagram of load-balancing across multiple web/emulator servers according to the teachings of the present invention. An HTTP server 70 is coupled to a client system 72. HTTP server 70 receives request information, REQUEST, from client system 72 in the form of a uniform resource locator (URL) and provides redirection information, REDIRECT, to client system 72. Client system 72 is then coupled to one of a plurality of web/emulation servers 74 according to the redirection information. In this manner HTTP server 70 can redirect access by a plurality of client systems 72 to manage the load on web/emulation servers 74 to ensure a balance across all available web/emulation servers 74.

This load-balancing can remain transparent to a user of client system 72. The user enters the uniform resource locator associated with the legacy host system. That information is transmitted to HTTP server 70 as a request. HTTP server 70 interprets the request, identifies the selected legacy host system, and selects a web/emulation server 74 to manage the connection. This selection of a web/emulation server 74 can be based upon information of the current loading of each web/emulation server 74. HTTP server 70 transparently provides redirect information to client system 72 which identifies the uniform resource locator of the selected web/emulation server 74. Client system 72 then initiates the above described terminal session through the selected web/emulation server 74 and the selected web/ emulation server 74 connects to the legacy host system as described above The present invention provides web browser connectivity with relatively low initial and recurring cost. The need for individual emulation software products based upon each particular client system is removed. This eliminates many technical support, help desk and software distribution problems, including version level control and configuration management issues. Extensive user training is no longer necessary because web browsers generally offer intuitive common user interfaces and are known by many users. Implementation time is improved by taking advantage of an existing widely-installed web browser base. Specifically, the platform independence provided by the JAVA architecture allows the web browser terminal emulator of the present invention to avoid problems with operation differences between computer environments. In addition, numerous users can be supported concurrently by each web/emulation server. For example, the OC:// WEBCONNECT™ product from OPENCONNECT SYSTEMS can support a thousand users per instance.

The present invention provides connectivity from any client system, such as a personal computer or computer workstation, to a legacy host system, such as a mainframe or mid-range system, without costly redesign or rebuilding of legacy applications. The benefits of a distributed client/server type data exchange can be realized without requiring systems redesign. This approach means that the many advantages of Internet-type access and functionality can be blended into an organization's network architecture simply and efficiently, thus protecting existing information technology infrastructures and investments.

Although the present invention has been described in detail, it should be understood that various changes, substitutions and alterations can be made hereto without departing from the spirit and scope of the invention as defined by the appended claims.

APPENDIX A

The following provides one implementation of a communication protocol for web/emulation data flow between a client thread and an applet process. (For all values with a length, length = 0 indicates the field is not present. All fields are byte values.)
Client (applet process) to Server (client thread)
Connect Session
    / S / emutype / hostlen / hostname . . ./ lunamelen /
    luname . . . / portnolen / portno . . . / sessionlen
    sessionname . . .
        emutype: Emulation type to create 01 = 3270, 02 =
        5250, 04 @ VT220 hostlen, hostname: length
        and content of gateway hostname to connect with
        lunamelen, luname: length and content of luname
        name for session
        portnolen, portno: length and content of port
        number (as ASCII text): for gateway sessionlen,
        sessionname: length and content of session name
Field Update
    / F / reason / reasonparm / curposhigh / curposlow /
    fieldcounthigh / fieldcountlow / bufposhigh /
    bufposlo lengthy / lengthlow / fieldchars
        reason: Reason for field update. 0 1 =
        unsolicited, 02 = reply to Query Field Update
        from server.
        reasonparm: If reason = 01, AID value from
        client. If reason = 02, reasonparm from
        Query Field Update command from server.
        curposhigh, curposlow: Cursor position at time
        of update
        fieldcounthigh, fieldcountlow: count of fields
        bufposhigh, bufposlow: Buffer position of field
        lengthy, lengthlow: Length of field data (16
        bits)
        fieldchars: field data in ASCII
        row, column, length, fieldchars . . . are
        repeatedfieldcount times.
NVT Keystroke
    / N / asciikey
        asciikey: value of keystroke as an ASCII
        character
Run Script
    / R / scriptnamelen / scriptname . . .
        scriptnamelen, scriptname: length and name of
        TCL script to execute
Query Help Desk
    / H /
Process Emulation Keystroke
    / K / keyvaluehigh I keyvaluelow
        keyvaluehigh I keyvaluelow: Emulation
        key value to process
Server (client thread) to Client: (applet process)
Erase Display
    /E/
Set Display Size
    / S / rows / columns
        rows: Number of rows for display
        columns: Nuinber of columns for display
Set Cursor position
    / C / bufposhigh, bufposlow
        bufposhigh, bufposlow: Position for cursor
Display Text
    / D / bufposhigh I bufposlow I lengthhigh I
    lengthlow I . . .
        bufposhigh, bufposlow: Position for text
        (Ignored when in NVT mode) lengthhigh,
        lengthlow: Len-th of text (16 bits)
        text: ASCII text for
OIA       Text
    / 0 / column / length / oiatext . . .
Field  List
    / F / fieldcounthigh, fieldcountlow / bufposhigh /
    bufposlow / fieldattr / xattr / lengthhigh /
    lengthlow fieldcounthigh, fieldcountlow: Number of
    fields (O = unformatted screen) bufposhigh,
    bufposlow: Position for start of field fieldattr:
    Field attribute byte

| 3270 bits | definition use |
|---|---|
| 0 | Modified Data Tag (I @ field modified) |
| 0 | Reserved (0) |
| 2–3 | 00 = Display/non-detectable, 01 = Display/detectable, 10=lntensitied Display/detectable, 11 = Nondisplay/non-detectable |
| 4 | 0= Alphanumeric, 1 = Numeric |
| 5 | 0 = Unprotected, 1 = protected | xattr: Fieid extended attribute byte 3270 Definition

| 3270 bits | Definition use |
|---|---|
| 7 | field mark |
| 6 | unused |
| 5 | transparent /opaque |
| 4–3 | highlighting (00=default, 01= blinking, 10=reverse, 11=underline) |
| 2–0 | coior(00 1=biue, 010= red, 011=pink, 100=green, 101=turquoise, 110=yellow, 111=white) | lengthhigh, lengthlow: length of field (16
    bits, may wrap off initial row)
    bufposhigh, btifposlow, fieldattr, lengthhigh,
    lengthlow are repeatedfieldcounthighi
    fieldcountlow times.
Character Override Attribute List
    /A / attrcounthigh / attrcountloW / bufposhigh /
    bufposlow / lengthhigh / lengthlow / attrbyte1
    attrcounthigh, attrcountlow: Count of attributes
        bufposhigh, biifposlow: position of attribute
        lengthhigh, lengthlow: length of field (16
        bits, may wrap off initial row)
        attrbytel: Attribute byte 1

APPENDIX A-continued

```
3270        Definition
bits        use
0–2         color bits (1 = Blue, 2 = Red, 3 =
            pink, 4 = Green, 5 =
            Turquoise, 6 = Yellow, 7 = White)
3–4         Extended highlighting (mutually
            exclusive) (01= Blinking, 10 =
            Reverse, 11 = Underline)
7           Field mark (1= Start of field
            position)
    bufposhigh, bufposlow,, lengthhigh, lengthlow,
    attrbyte1 are repeated attrcounthigh,
    attrcountlow times.
Query Field Update
    / Q / reasonparm
        reasonparm: Reason value returned in Field
        Update message from client
Set NVT Mode
    / N / nvtmode
        nvtmode: 00 = Emulation mode, 0 1 = NVT mode
Keyboard Lock State
    / K / mode
        mode: 00 = KB Free, 01 = KB Locked
Sound Alarm
    / B / length / filenametext . . .
        length - Length of filename
        filenametext: Name of audio file for alarm
Error Message
    / M / length / messagetext . . .
        length, messagetext: Length and content of
        error message
Protocol Version
    / V / verhigh / verlow
        verhigh, verlow: Protocol version number
Help Desk Reply
    / H /
        length / versionstr: Server version
        SessionIDhigh / sessionIDlow: server session ID
        for this client connection
        emulationtype: 01 = 3270, 02 = 5250
        (if emulation type is 3270)
            displaytype: 00 = 3278, 01 = 3279, 02 =
            3179, 03 = 3472
            status: 00 = Unowned, 01 = SSCP, 02 =LULU
            defaultpartition.- default model size 2–
            5
            alternatepartition: alternate model size 2–
            5
            currentpartition: current model size 2–5
        (if emulation type is 5250)
            displaytype: 00 = 3477, 01 = 3179, 02 =
            5151, 03 = 3196
            screensize: screen size, 2 or 5
            ocserver: 01= connected to OC server, 00 =
            other type of server
            ptsoverride: 01 = passthru screen
            override, 00 = no override
            monochrome: 00= color, 01 = monochrome
        protccoltype: 0 1 = RUI, 02 =TN
        (if protocol type is RUI)
            length /requstedLUname: configured LU name
            length/grantedLuname: LU name returned by
            server
            length/ruiversion: Version of RUI support
            in use
            sessIDhigh I sessIDlow: RUI session ID
        (if protocol type is T-N)
            length, termTypeString: terminal type
            string negoiated with TN server is
            TN3270EI: 00 = not 3270E, 01 = using 3270E
            length, devicename: device name in use
            length, puLuName:; PU/LU name for session
            (OCS gateways only)
        transporttype. 00= None (valid if protocol is
        RUI), 01 = Network (it transport type is
        Network)
            length, configuredHostName: host name in
            session configuration
            length, configuredport: port in session
```

APPENDIX A-continued

```
        configuration
        length, connectedHostName: host name (ip
        address) in actual use
        length, connectedport: port in actual use
Update Complete
    /W /
```

What is claimed is:

1. A server for providing a persistent connection between a client system and a host system for terminal emulation, comprising:

a client thread operable to communicate with a host system across a first persistent connection; and applet code operable to create an applet process executing under a web browser on a client system, the server operable to download the applet code to the client system in response to receiving a uniform resource locator associated with the host system, and, when executed by the client system, the applet process operable to communicate with the client thread across a second persistent connection and to provide a terminal session to a user of the client system, such that the terminal session is supported by a persistent connection allowing communication with the host system.

2. The server of claim 1, wherein the server comprises a process executed by a separate server system.

3. The server of claim 2, wherein the client thread and the applet process are operable to communicate using a data flow based upon a specified communication protocol.

4. The server of claim 3, wherein the client thread is further operable to interface between a data flow used by the host system and the data flow used by the applet process.

5. The server of claim 1, wherein the applet code comprises executable code for a JAVA applet to be executed under a JAVA-capable web browser.

6. The server of claim 2, wherein the first and second persistent connections are persistent TCP/IP socket connections.

7. The server of claim 4, wherein the client thread is operable to communicate using a TN3270 data flow and the applet process is operable to provide a 3270 type terminal session.

8. The server of claim 4, wherein the client thread is operable to communicate using a TN5250 data flow and the applet process is operable to provide a 5250 type terminal session.

9. The server of claim 4, wherein the client thread is operable to communicate using an NVT data flow and the applet process is operable to provide an NVT type terminal session.

10. The server of claim 4, wherein the client thread is operable to communicate using a VT220 data flow and the applet process is operable to provide a VT220 type terminal session.

11. A web browser terminal emulator, comprising:

an applet process executing under the web browser, the applet process executed in response to selection of a uniform resource locator associated with a host system, the applet process operable to communicate with the host system across a persistent connection and to provide a terminal session to a user of the client system, such that the terminal session is supported by the persistent connection allowing communication with the host system.

12. The web browser terminal emulator of claim 11, wherein the applet process is created by applet code downloaded to the client system from a server in response to selection of the uniform resource locator associated with the host system.

13. The web browser terminal emulator of claim 12, wherein the applet process is operable to communicate using a data flow based upon a specified communication protocol.

14. The web browser terminal emulator of claim 13, further comprising a client thread operable to interface between a data flow used by the host system and the data flow used by the applet process.

15. The web browser terminal emulator of claim 11, wherein the applet process comprises a JAVA applet executing under a JAVA-capable web browser.

16. The web browser terminal emulator of claim 11, wherein the persistent connection is a persistent TCP/IP socket connection.

17. The web browser terminal emulator of claim 11, wherein the applet process is operable to provide a 3270 type terminal session.

18. The web browser terminal emulator of claim 11, wherein the applet process is operable to provide a 5250 type terminal session.

19. The web browser terminal emulator of claim 11, wherein the applet process is operable to provide an NVT type terminal session.

20. The web browser terminal emulator of claim 11, wherein the applet process is operable to provide a VT220 type terminal session.

21. A computer network environment allowing connection of a client system to a host system for terminal emulation, the computer network environment comprising:
  a host system operable to support a terminal session for access to the host system; and
  a client system executing an applet process under a web browser in response to selection of a uniform resource locator associated with the host system, the applet process operable to communicate with the host system across a persistent connection and to provide a terminal session to a user of the client system, such that the terminal session is supported by the persistent connection allowing communication with the host system.

22. The computer network environment of claim 21, further comprising a server system executing a client thread under a server, the client thread operable to communicate with the host system and the applet process.

23. The computer network environment of claim 22, wherein the applet process is operable to communicate using a data flow based upon a specified communication protocol.

24. The computer network environment of claim 23, wherein the client thread is operable to interface between a data flow used by the system and the data flow used by the applet process.

25. The computer network environment of claim 21, wherein the host system comprises a mainframe computer system.

26. The computer network environment of claim 21, wherein the host system comprises a mid-range computer system.

27. The computer network environment of claim 21, wherein the host system comprises a computer workstation executing a UNIX environment.

28. The computer network environment of claim 21, wherein the applet process comprises a JAVA applet executing under a JAVA-capable web browser.

29. The computer network environment of claim 21, wherein the persistent connection is a persistent TCP/IP socket connection.

30. The computer network environment of claim 21, wherein the applet process is operable to provide a 3270 type terminal session.

31. The computer network environment of claim 21, wherein the applet process is operable to provide a 5250 type terminal session.

32. The computer network environment of claim 21, wherein the applet process is operable to provide an NVT type terminal session.

33. The computer network environment of claim 21, wherein the applet process is operable to provide a VT220 type terminal session.

34. A method for connecting a client system to a host system for terminal emulation, comprising:
  executing an applet process under a web browser on the client system in response to selection of a uniform resource locator associated with a host system;
  connecting the applet process to the host system across a persistent connection;
  communicating between the applet process and the host system across the persistent connection; and
  providing a terminal session to a user of the client system by the applet process, such that the terminal session is supported by the persistent connection allowing communication with the host system.

35. The method of claim 34, further comprising downloading executable code for the applet process to the client system in response to the selection of a uniform resource locator associated with the host system.

36. The method of claim 34, wherein connecting the applet process to the host system is accomplished using a client thread executing under a server.

37. The method of claim 36, wherein communicating between the client thread and the applet process is accomplished using a data flow based upon a specified communication protocol.

38. The method of claim 34, wherein executing the applet process comprises executing a JAVA applet under a JAVA-capable web browser.

39. The method of claim 34, wherein providing a terminal session comprises providing a 3270 type terminal session.

40. The method of claim 34, wherein providing a terminal session comprises providing a 5250 type terminal session.

41. The method of claim 34, wherein providing a terminal session comprises providing an NVT type terminal session.

42. The method of claim 34, wherein providing a terminal session comprises providing a VT220 type terminal session.

43. A method for load-balancing across multiple servers for providing a persistent connection between a client system and a host system for terminal emulation, comprising:
  receiving a uniform resource locator from a client system;
  interpreting the uniform resource locator to identify a selected host system;
  selecting a server from a plurality of servers to manage a connection with the client system;
  providing redirect information to the client system, the redirect information identifying the selected server;
  downloading executable code for an applet process to the client system from the selected server; executing the applet process under a web browser on the client system;
  connecting the applet process to the selected host system across a persistent connection supported by the selected server;
  communicating between the applet process and the host system across the persistent connection; and providing a terminal session to a user of the client system by the applet process, such that the terminal session is supported by the persistent connection allowing communication with the host system.

44. The method of claim 43, wherein selecting a server is based upon a current load of each of the plurality of servers.

45. A computer-implemented terminal session emulator for providing browser-based client system access to a host application running on a host system, comprising:

applet code operable to create an applet process executing on the client system, said applet code being downloadable from a web server in response to receipt of a uniform resource locator associated with the host; and an emulation server operable to negotiate a persistent connection between the host system and the client system, and further operable to perform data conversions that modify a data stream associated with the host application between a client data format associated with the applet process and a host data format associated with the host application.

46. The emulator of claim 45, wherein the client data format and the host data format are different communication protocols.

47. The emulator of claim 45, wherein the client data format and the host data format are encrypted and decrypted data formats.

48. The emulator of claim 45, wherein the client data format and the host data format are compressed and decompressed data formats.

49. The emulator of claim 45, wherein said emulation server is implemented at the host system.

50. The emulator of claim 45, wherein said emulation server is implemented at the web server.

51. The emulator of claim 45, where said emulation server communicates with said host system via a TN interface associated with said host system.

52. The emulator of claim 45, wherein the applet code comprises executable code for a JAVA applet to be executed under a JAVA-capable web browser.

53. The emulator of claim 45, wherein the persistent connection is a persistent TCP/IP connection.

54. The emulator of claim 45, wherein said data format modifies a 3270 data stream.

55. The emulator of claim 45, wherein said data format modifies a 5250 data stream.

* * * * *